(12) United States Patent
Lin

(10) Patent No.: US 7,077,406 B2
(45) Date of Patent: Jul. 18, 2006

(54) PEDAL-CONTROLLED MOVABLE BOTTOM FRAME

(76) Inventor: Chun-Kai Lin, No. 179, Sec. 2, Yongping Rd., Taiping City, Taichung County 411 (TW)

( * ) Notice: Subject to any disclaimer, the term of this patent is extended or adjusted under 35 U.S.C. 154(b) by 380 days.

(21) Appl. No.: 10/739,061

(22) Filed: Dec. 19, 2003

(65) Prior Publication Data

US 2005/0132940 A1    Jun. 23, 2005

(51) Int. Cl.
*B62B 5/00*    (2006.01)
(52) U.S. Cl. .................. 280/79.11; 280/43.13; 280/43.17; 414/458; 414/495
(58) Field of Classification Search .............. 280/43, 280/43.17, 43.13, 43.18, 43.19, 43.2, 79.11, 280/79.7, 79.2, 79.5; 414/458, 444, 476, 414/490, 495
See application file for complete search history.

(56) References Cited

U.S. PATENT DOCUMENTS

| 2,937,850 | A | * | 5/1960 | Winkler et al. ............. 254/8 R |
|---|---|---|---|---|
| 3,845,933 | A | * | 11/1974 | Heizer, Jr. .................. 254/8 R |
| 5,876,173 | A | * | 3/1999 | English, Jr. ................. 414/458 |
| 5,957,649 | A | * | 9/1999 | English et al. ............. 414/458 |
| 6,079,931 | A | * | 6/2000 | English et al. ............. 414/458 |
| 6,311,992 | B1 | * | 11/2001 | Theising .................. 280/79.11 |
| 6,533,524 | B1 | * | 3/2003 | English et al. ............. 414/458 |
| 6,659,706 | B1 | * | 12/2003 | English et al. ............. 414/458 |
| 6,715,979 | B1 | * | 4/2004 | Theising et al. ............ 414/458 |
| 6,837,665 | B1 | * | 1/2005 | English et al. ............. 414/458 |
| 6,971,656 | B1 | * | 12/2005 | Lin ......................... 280/79.11 |
| 2001/0018016 | A1 | * | 8/2001 | English et al. ............. 414/458 |
| 2001/0041125 | A1 | * | 11/2001 | English et al. ............. 414/458 |
| 2003/0086777 | A1 | * | 5/2003 | English et al. ............. 414/495 |
| 2005/0220585 | A1 | * | 10/2005 | English et al. ............. 414/458 |

* cited by examiner

Primary Examiner—J. Allen Shriver
(74) Attorney, Agent, or Firm—Troxell Law Office, PLLC

(57) ABSTRACT

A pedal-controlled movable bottom frame includes a frame body, two movable connecting rods and a position rod. The frame body and the movable connecting rods are respectively provided with two casters and have their ends respectively assembled with four support legs of a worktable. The position rod is assembled between the two movable connecting rods, having its intermediate portion secured with a retaining unit. A pedal is assembled on the frame body above the retaining unit, and a clasping member is provided under the pedal. The frame body and the movable connecting rods is turned downward by treading the pedal once, letting the casters support the worktable and the clasping member clasp the retaining unit. The clasping member disengages from the retaining unit by treading the pedal once again, letting the support legs support the worktable again.

8 Claims, 9 Drawing Sheets

PEDAL-CONTROLLED MOVABLE BOTTOM FRAME

BACKGROUND OF THE INVENTION

1. Field of the Invention

This invention relates to a pedal-controlled movable bottom frame, particularly to one pivotally assembled on the lower portions of four stationary support legs of a worktable, able to be controlled by pedaling to take the place of the four support legs to support the worktable and make it slidable on the ground.

2. Description of the Prior Art

Generally, most medium-sized or small-sized processing machines, such as planers, sanders and the like, are respectively provided with four stationary support legs to maintain the height and support the weight of a worktable. When such a worktable needs to be transferred from one place to another, it has to be moved by manpower or by special carriers, taking too much time and labor in transfer of the worktable. In view of the above-mentioned defect, the worktable has its four legs respectively provided at the lower end with a caster with a brake able to control the worktable to be stopped or moved slidably. Nevertheless, such casters are likely to be damaged after used for a period of time and have no excellent effect in braking, likely to cause sway to the worktable to influence the precision and quality of processing when the machine operates. Additionally, each caster is independently assembled on each leg of the worktable; therefore each caster has to be braked or released respectively, resulting in much inconvenience in use.

In the U.S. Pat. Nos. 5,976,173, 5,957,649 and 6,311,992, a worktable has its legs provided at the lower end with a support frame with casters, which can be shrunk inward and positioned at an upper position of the legs of the worktable and also can be controlled to stand on the ground to lift up the worktable and move it slidably by means of the casters.

However, the foresaid support frame is generally made of two separate frames combined together so it is complicated in structure and inconvenient in assembly, increasing producing and assembling cost.

SUMMARY OF THE INVENTION

The objective of the invention is to offer a pedal-controlled movable bottom frame pivotally assembled with the lower portions of the stationary support legs of a worktable, able to be controlled by pedaling in due time to lift up and support the worktable to take the place of the stationary support legs to enable the worktable to slide about on the ground.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
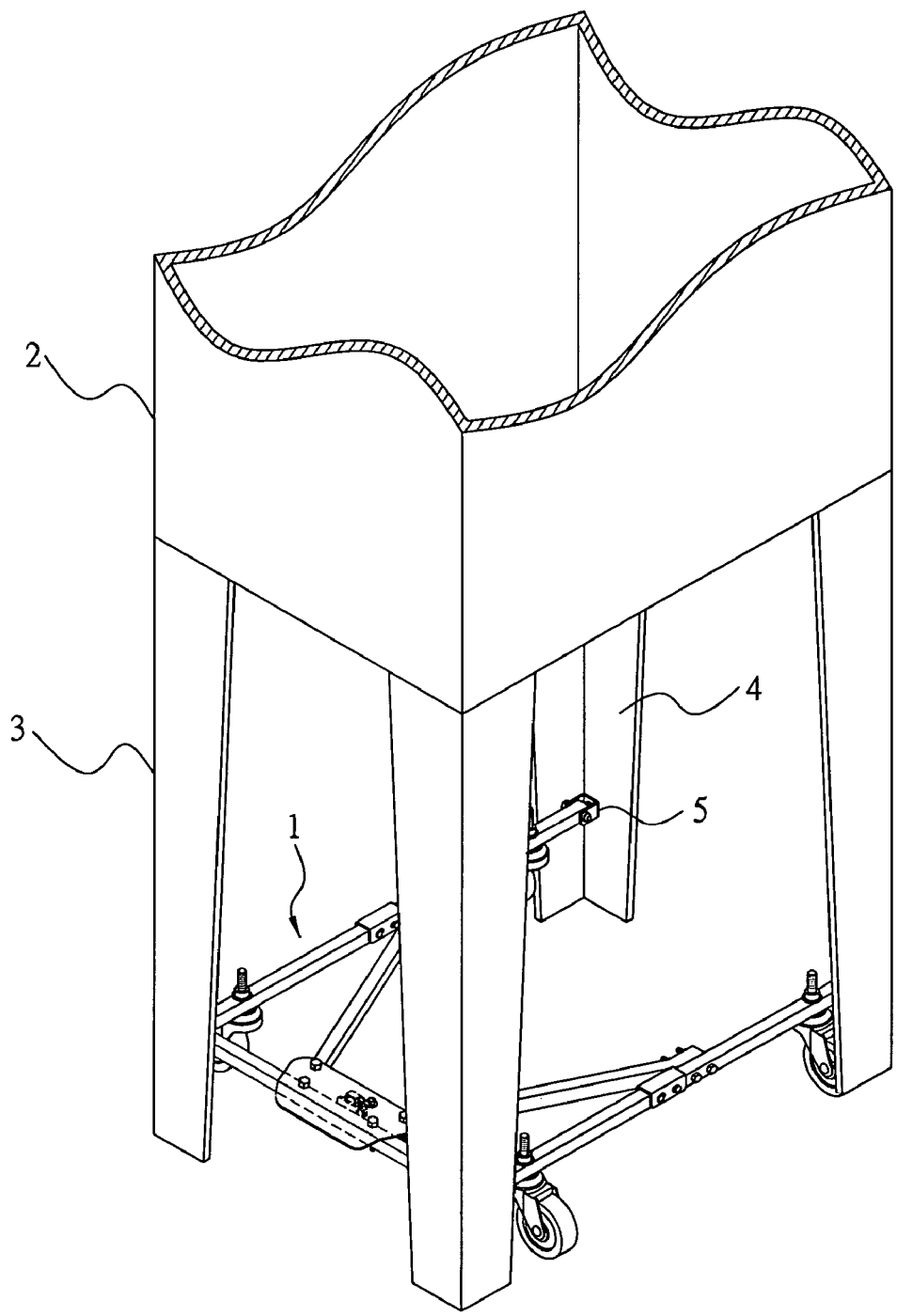
FIG. 1 is a perspective view of a pedal-controlled movable bottom frame assembled with four legs of a worktable in the present invention.
Figure 2:
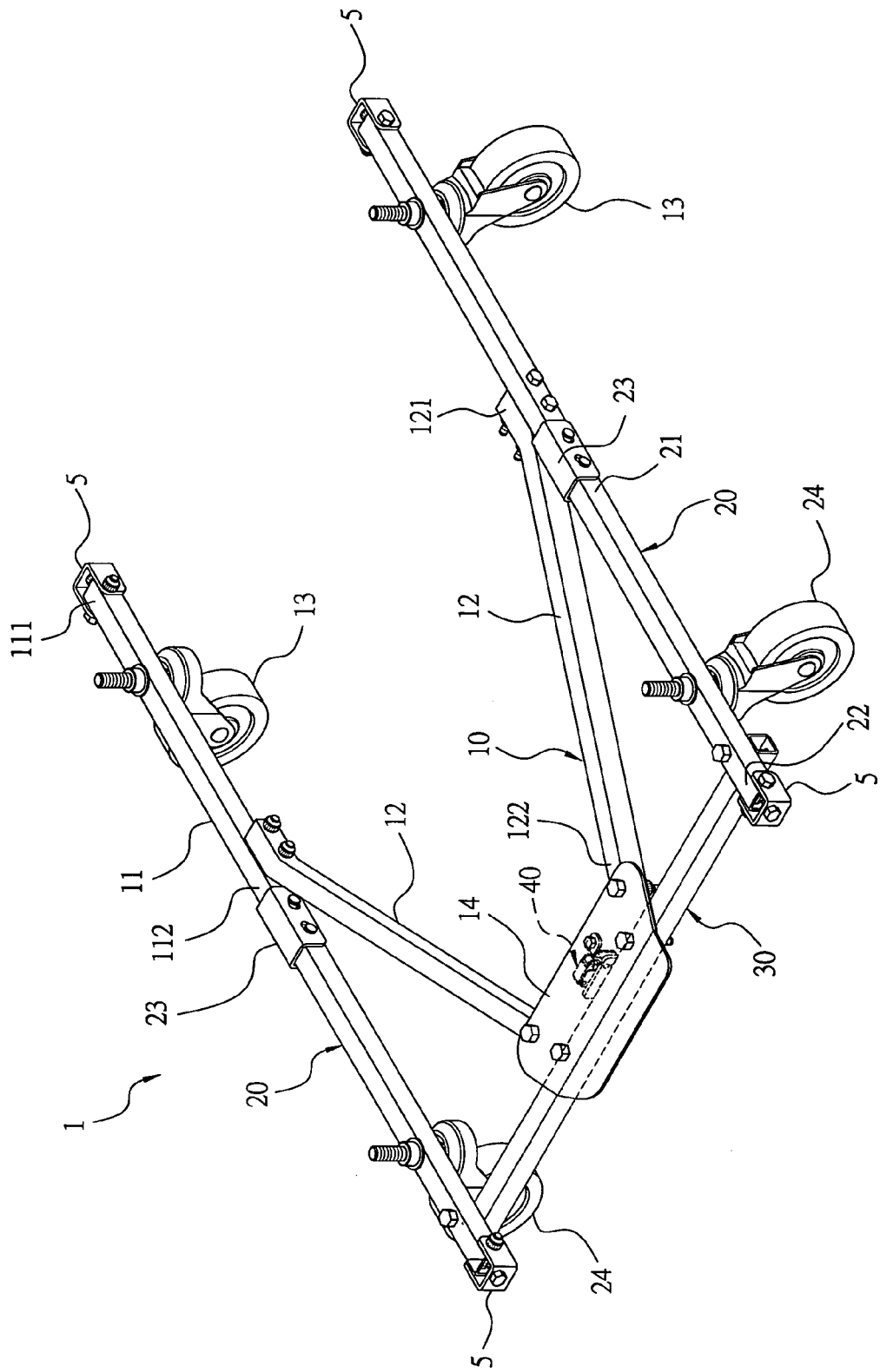
FIG. 2 is a perspective view of the pedal-controlled movable bottom frame in the present invention.
Figure 3:
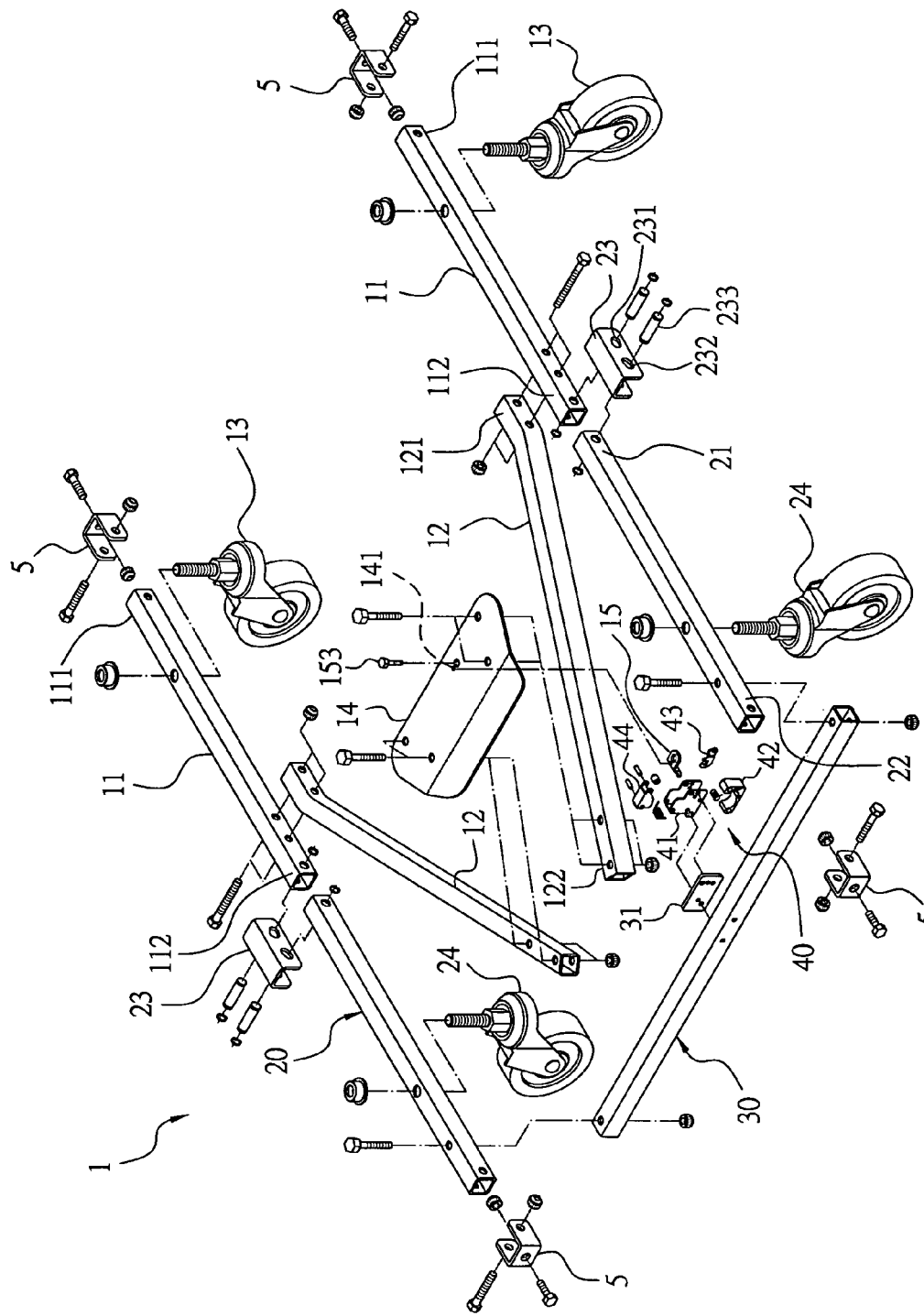
FIG. 3 is an exploded perspective view of the pedal-controlled movable bottom frame in the present invention.

A preferred embodiment of a pedal-controlled moveable bottom frame 1 in the present invention, as shown in FIGS. 1, 2 and 3, is pivotally assembled with the lower inner portions of four support legs 3 of a worktable 2. The four support legs 3 of the worktable 2 are respectively formed with an L-shaped elongate bar having inner walls 4 fixed thereon with a U-shaped pivotal lug 5 to be assembled with the pedal-controlled movable bottom frame 1. The pedal-controlled movable bottom frame 1 in the present invention includes a frame body 10, two movable connecting rods 20, a position rod 30 and a retaining unit 40 as main components combined together.

The frame body 10 consists of two side rods 11 and two oblique rods 12. Each side rod 11 has its rear free end 111 pivotally assembled with the U-shaped pivotal lug 5 of the support leg 3, with a caster 13 fixed under the rear free end 111 near the pivotal portion of the support leg 3. The two side rods 11 have the inner sides of their front free ends 112 respectively secured with the rear free ends 121 of the two oblique rods 12, which have their front free ends 122 extending inward obliquely. The two oblique rods 12 have their front free ends 122 fixed thereon with a pedal 14 preset in shape and size. A clasping member 15 having an ear 151 with an insert hole 153 is threadably secured at one side under the pedal 14 by a bolt 153. The ear 151 of the clasping member 15 is provided with a position block 154 on the topside near the insert hole 152 to be fitted in a position hole 141 bored under the pedal 14. Further, the ear 151 has one edge extending downward slantingly and forming a clasping portion 155 with its topside formed with an arc-shaped clasping surface 156.

The two movable connecting rods 20 have their rear free ends 21 respectively connected pivotally with the front free ends 112 of the two side rods 110 of the frame body 10 by means of two U-shaped connectors 23. Each connector 23 is formed with two parallel side plates 231 respectively having two sliding slots 232 slanting upward, with two pivots 233 respectively inserted through the two sliding slots 232 as well as the front free end of the side rod 11 and rear free end of the movable connecting rod 20 so as to enable the side rods 11 and the movable connecting rods 20 to slide relatively through the pivot 233 positioned in the sliding slots 232. Further, the two movable connecting rods 20 have their front free ends 22 respectively assembled pivotally with the U-shaped pivotal lug 5 of the other two support legs 3 of the worktable 2, with two casters 24 respectively fixed under the two movable connecting rods 20 near the front free end 22.

The position rod 30 has its opposite ends respectively fixed under the two movable connecting rods 20 near the pivotal portions of the support legs 3, having a fixing plate 31 secured on the rear side of an intermediate portion.

Figure 4:
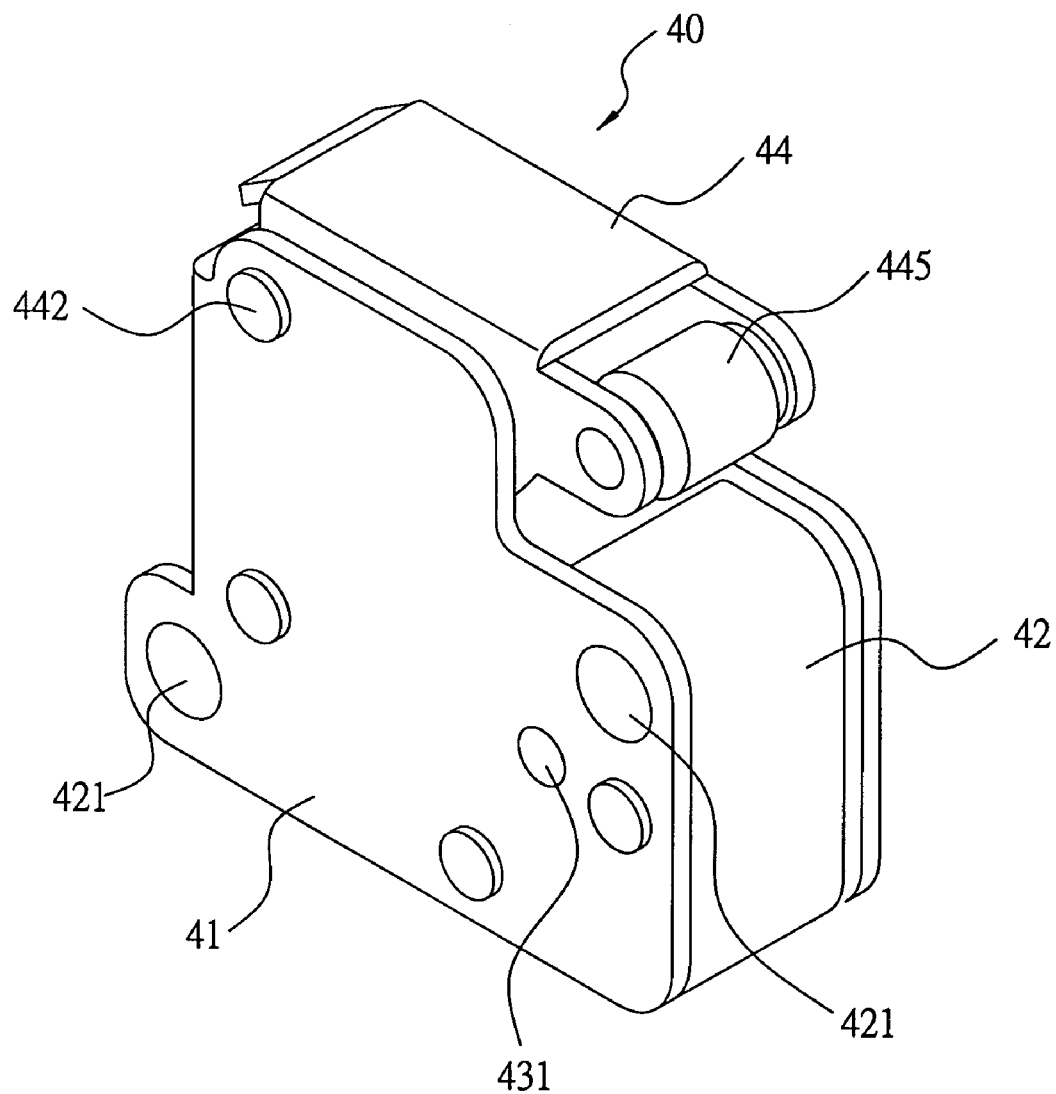
FIG. 4 is a perspective view of the retaining unit of the pedal-controlled movable bottom frame in the present invention.
Figure 5:
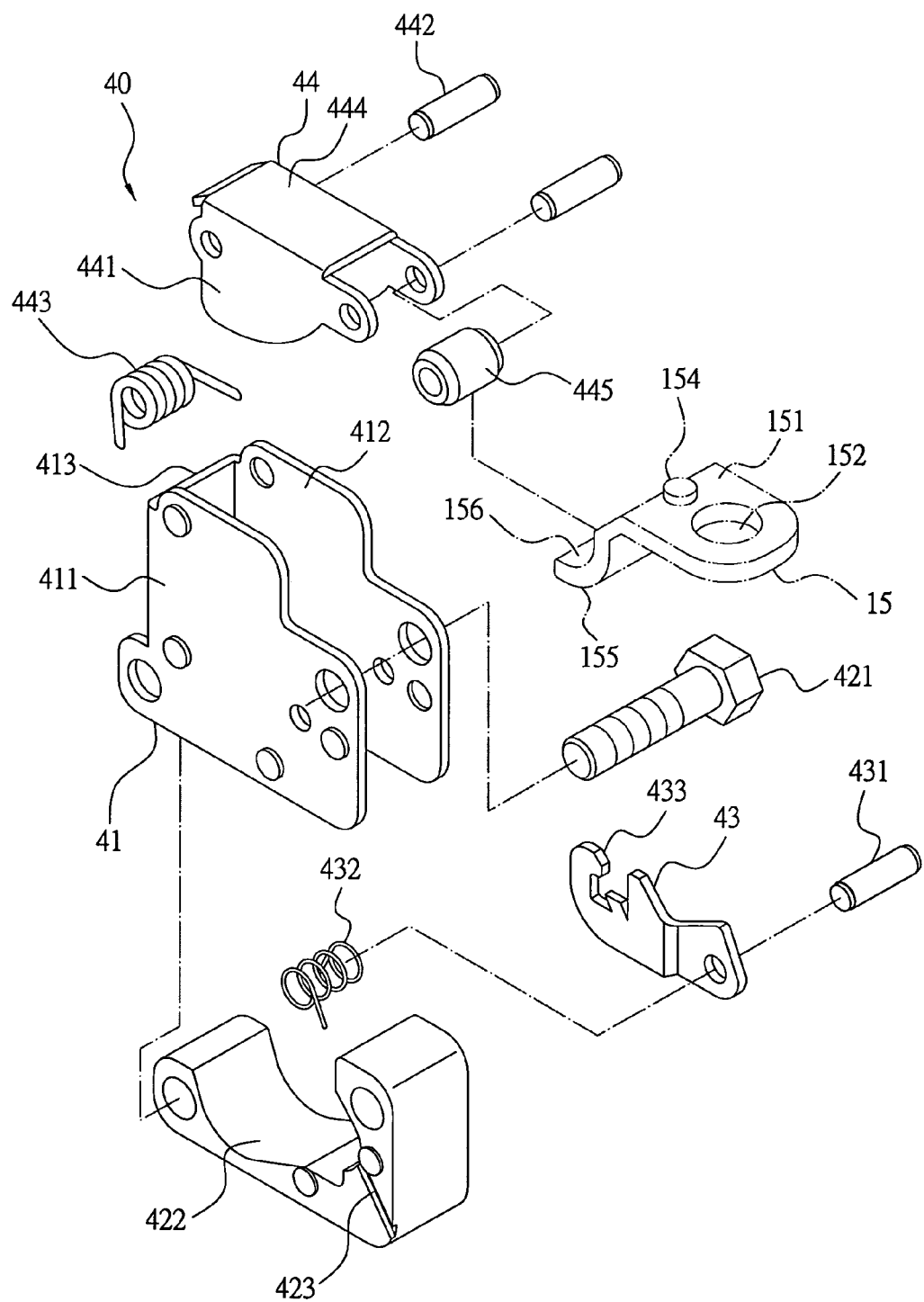
FIG. 5 is an exploded perspective view of the retaining unit of the pedal-controlled movable bottom frame in the present invention.

The retaining unit 40, as shown in FIGS. 4 and 5, includes a U-shaped frame 41, a bottom base 42, a hooking plate 43 and a coupling member 44. The U-shaped frame 41 is formed with two parallel side plates 411 having an accommodating space 412 formed therebetween. The bottom base 42 is received in a lower portion of the accommodating space 412 of the U-shaped frame 41, with two bolts 421 inserted through the bottom base 42 and the U-shaped frame 41 to fix both of them on the fixing plate 31 of the position rod 30. The bottom base 42 has its upper side formed with an arc-shaped recess 422 and one side bored with a spring positioning groove 423 communicating with the arc-shaped recess 422. The hooking plate 43 is fitted in the arc-shaped recess 422 of the bottom base 42 and has one end assembled between the two side plates 411 of the U-shaped frame 41 by a pivot 431 fitted thereon with a torsion spring 432, which has one end inserted in the spring positioning groove 423 of the bottom base 42 and the other end pushing against the lower edge of the hooking plate 43 to let the hook 433 of the hooking plate 43 always pressed to turn upward pivotally. The coupling member 44 is formed with two parallel side plates 441 having one end assembled pivotally with the upper portion of the two side plates 411 of the U-shaped frame 4 1 by a pivot 442. A torsion spring 443 is fitted on the pivot 442 and has one end pushing against the inner wall of a back plate 413 connecting the two side plates 411 of the U-shaped frame 41 and the other end pushing against the inner wall of a top plate 444 connecting the two side plates 441 of the coupling member 44 to let a roller 445, which is pivotally positioned at the other end between the two side plates 441 of the coupling member 44, always pressed by the torsion spring 443 to turn upward pivotally. Further, the coupling member 44 has one side plate 441 extending downward and forming an engage edge 446, which can be clasped by the hook 433 of the hooking plate 43 when the coupling member 44 is pivotally turned one time and can be disengaged from the hook 433 when the coupling member 44 is pivotally turned a second time. Furthermore, when the coupling member 44 is pressed to turn pivotally by the clasping member 15 under the pedal 14, the clasping member 15 will have the arc-shaped clasping surface 156 of its clasping portion 155 clasping the lower edge of the roller 445.

Figure 6:
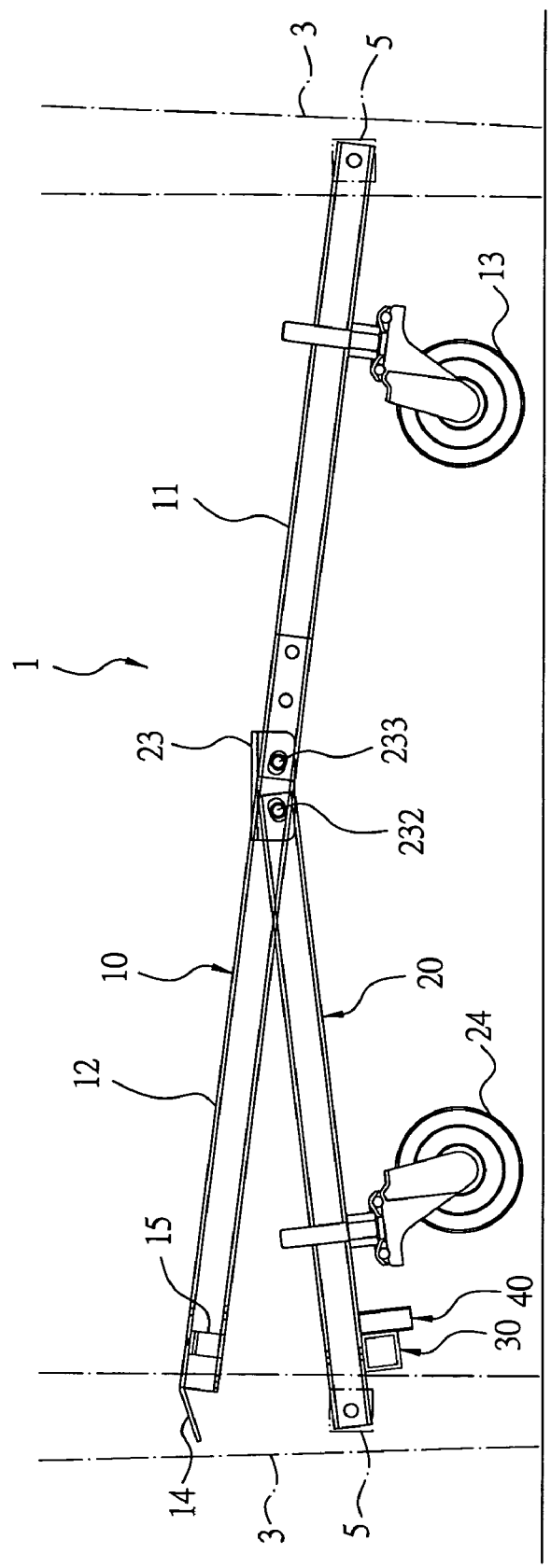
FIG. 6 is a side cross-sectional view of the pedal-controlled movable bottom frame in a supported condition in the present invention.

In a normal condition, the clasping member 15 of the frame body 10 is disengaged from the roller 445 of the retaining unit 40 on the position rod 30; therefore the casters 13, 24 under the frame body 10 and the movable connecting rods 20 are pressed by the weight of the worktable 2, and the frame body 10 and the movable connecting rods 20 are turned pivotally at their mutual pivotal joints and also at the pivotal joints between them and the four support legs 3 to let the worktable 2 completely supported by the four legs 3 standing on the ground. At this time, the pivotally connecting portions of the frame body 10 and the movable connecting rods 20 are moved upward and loosened, as shown in FIG. 6.

Figure 7:
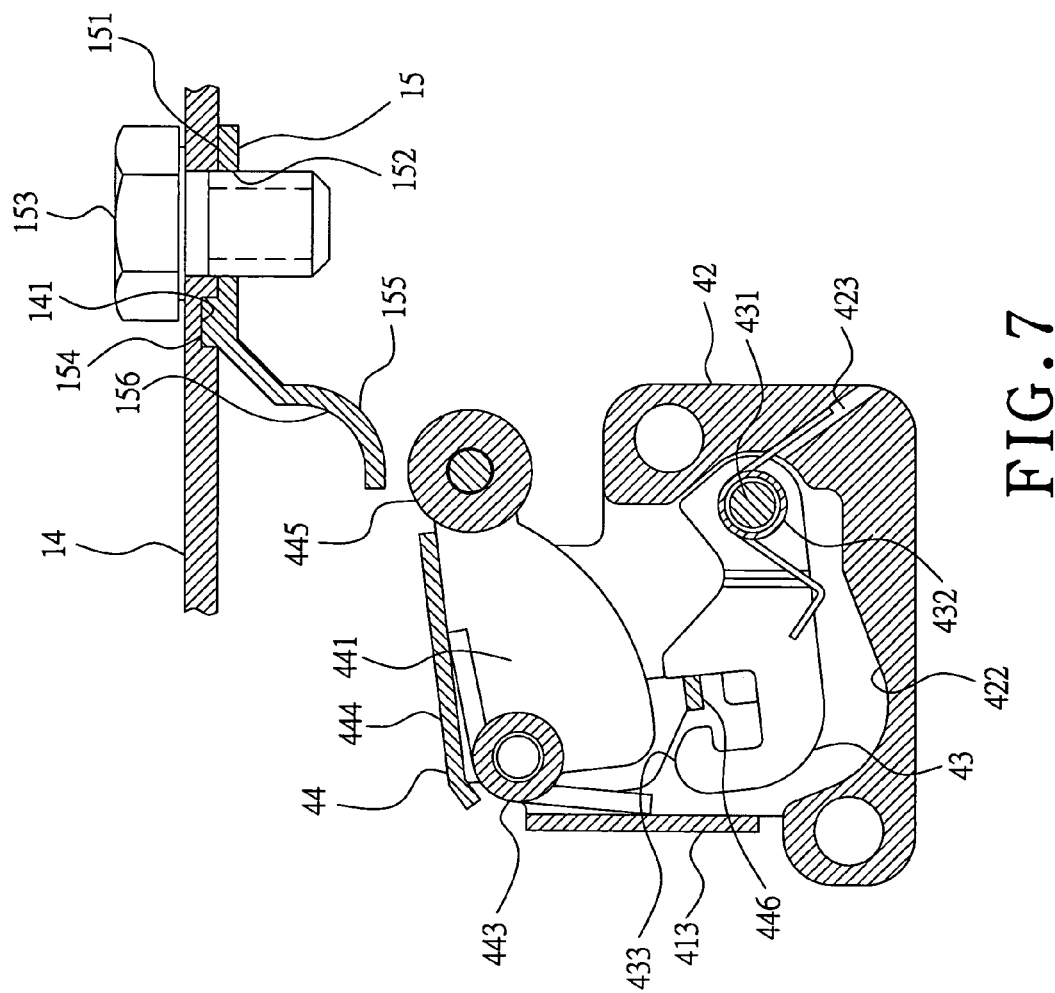
FIG. 7 is a side cross-sectional view of the clasping member and the retaining unit of the pedal-controlled movable bottom frame in a non-supported condition in the present invention.
Figure 8:
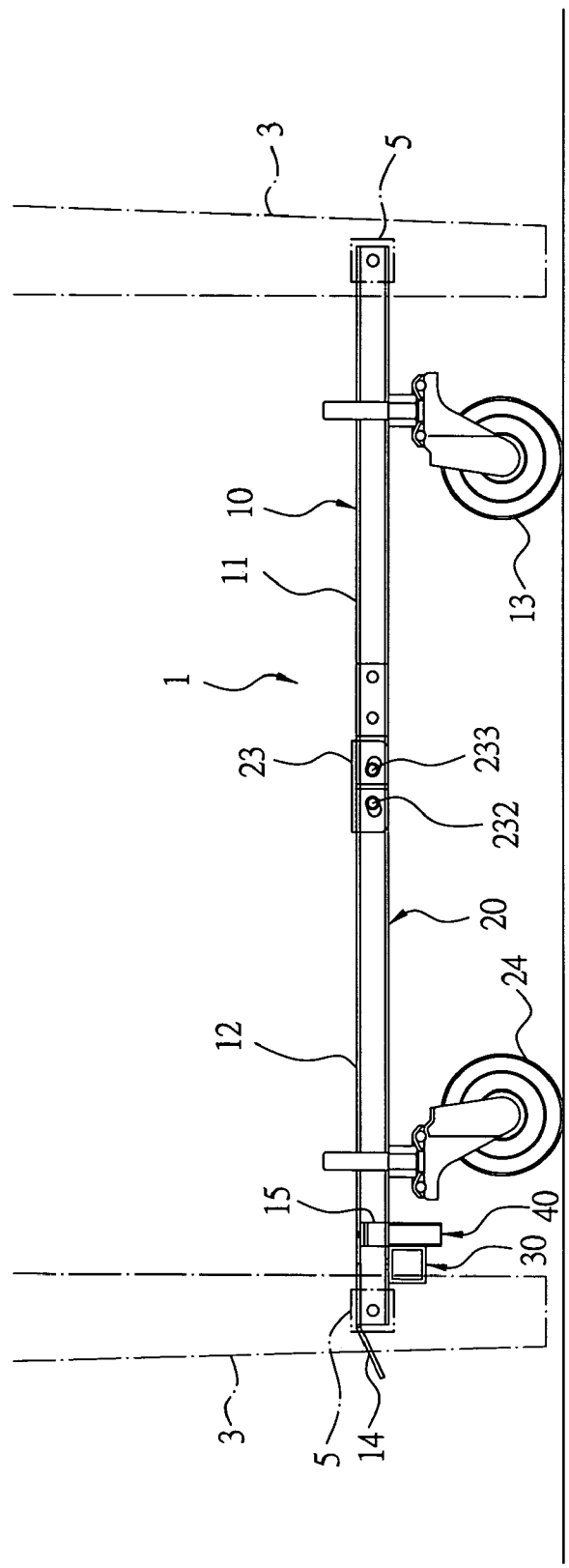
FIG. 8 is a side cross-sectional view of the pedal-controlled movable bottom frame in a non-supported condition in the present invention.
Figure 9:
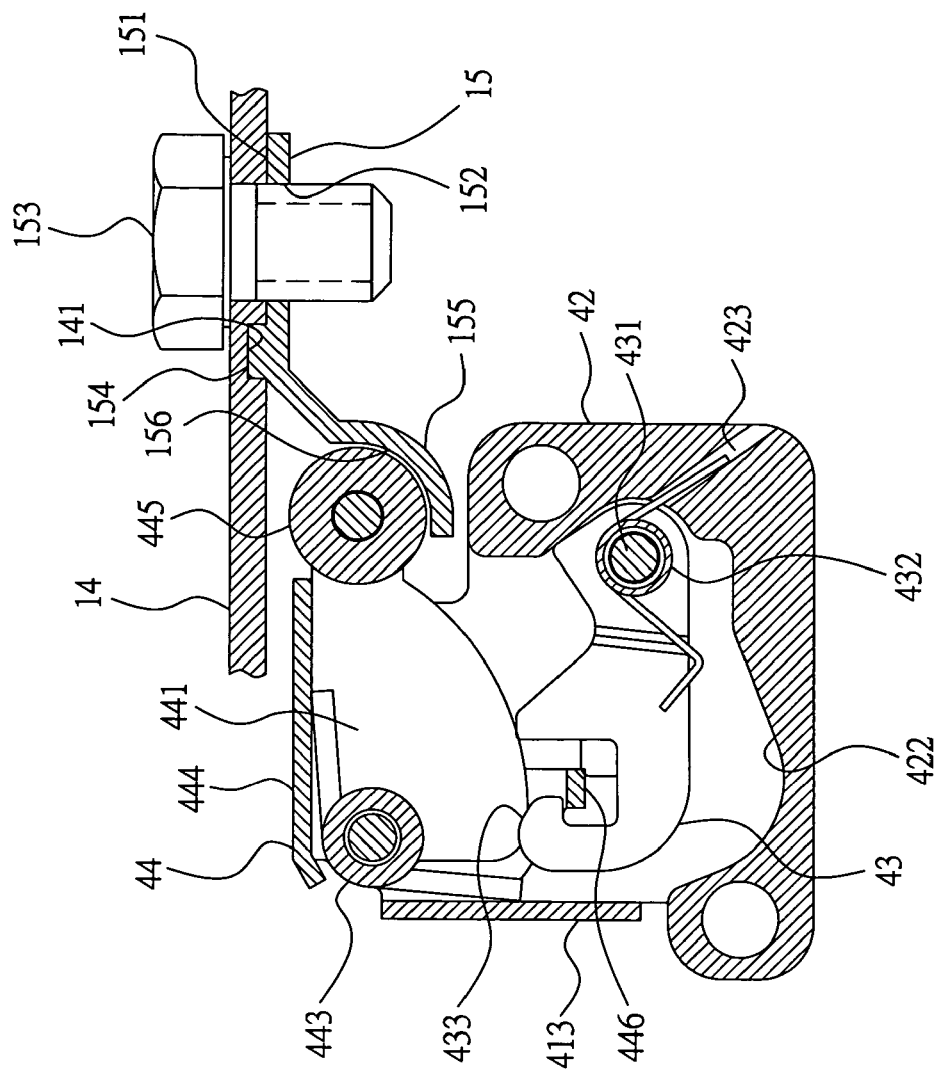
FIG. 9 is a side cross-sectional view of the clasping member and the retaining unit clasped with each other in the present invention.

To move the worktable 2 slidably on the ground, only tread down the pedal 14 of the frame body 10, and the frame body 10 will be pivotally turned downward with the pivotal joints of their front free ends 111 and the support legs 3 acting as rotary fulcrums, and the two movable connecting rods 20 will synchronously be turned downward to let the casters 13, 24 under the frame body 10 with the pivotal joints of their front free ends 22 and the support legs 3 acting as rotary fulcrums. Then the two movable connecting rods 20 stand on the ground and lift up the worktable 2. Simultaneously, the pedal 14 has its bottom edge pressing the roller 445 of the retaining unit 40 to actuate the coupling member 44 to turn downward pivotally and have its engage edge 446 clasped by the hook 433 of the hooking plate 43. Meanwhile the roller 445 is exactly positioned on the arc-shaped clasping surface 156 of the clasping member 15 to retain the clasping member 15 in position, as shown in FIG. 7. At this time, the frame body 10 and the position rod 30 can be firmly clasped together and the worktable 2 can be moved slidably on the ground by means of the casters 13, 24 under the movable bottom frame 1.

To let the worktable 2 supported by its four legs 3 again, just tread down the pedal 14 a second time to let its bottom edge press the roller 445 of the retaining unit 40 to move downward together with the coupling member 44, and synchronously the coupling member 44 will press the hooking plate 43 to move downward pivotally, letting the engage edge 446 of the coupling member 44 disengaged from the hook 433 of the hooking plate 43 and the coupling member 44 turned upward to its original position. Thus, the coupling member 44 together with the roller 445 is disengaged from the arc-shaped clasping surface 156 of the clasping member 15, letting the clasping member 15 loosened. At this time, the frame body 10 and the two movable connecting rods 20, which are pressed by the weight of the worktable 2, will be pivotally turned upward at the pivotal joints as described above, and the casters 13, 24 will leave the ground to let the four support legs 3 support the worktable 2 again. Obviously, the pedal-controlled movable bottom frame 1 in the present invention is able to control the worktable 2 to stand stably or moved slidably on the ground only by treading the pedal 14 alternately.

While the preferred embodiment of the invention has been described above, it will be recognized and understood that various modifications may be made therein and the appended claims are intended to cover all such modifications that may fall within the spirit and scope of the invention.

I claim:

1. A pedal-controlled movable bottom frame comprising:

A frame body composed of plural level rods pivotally connected with one another, said rods having two rear free ends respectively and pivotally connected with the lower portions of two support legs of a worktable, two casters respectively assembled under said rods near the two pivotal joints of said two support legs, said rods having two front free ends provided thereon with a pedal, a clasping member assembled under said pedal:

Two movable connecting rods having two rear free ends respectively and pivotally combined with the intermediate preset portions of said frame body, said two movable connecting rods having two front free ends respectively and pivotally connected with the lower portions of the other two support legs of said worktable, two casters respectively assembled under said two movable connecting rods near the two pivotal joints of said two support legs: and A position rod having its opposite ends respectively assembled under said two movable connecting rods near the pivotal joints of said two support legs, a retaining unit secured at the intermediate portion of said position rod, said retaining unit able to connect with said clasping member of said frame body, said retaining unit able to be turned and engaged with or disengaged from said clasping member by pedaling said pedal alternately.

2. The pedal-controlled movable bottom frame as claimed in claim 1, wherein said plural rods of said frame body comprises two side rods and two oblique rods, said two side rods having their rear free ends respectively and pivotally connected with two support legs of said worktable, said two side rods having the inner sides of their front free ends respectively fixed with the rear free ends of said two oblique rods, said two oblique rods having their two front free ends extending inward obliquely.

3. The pedal-controlled movable bottom frame as claimed in claim 2, wherein two said casters are respectively assembled under said two side rods near the pivotally connecting positions of said two support legs of said worktable.

4. The pedal-controlled movable bottom frame as claim in claim 2, wherein said two oblique rods have said two front free ends combined thereon with said pedal.

5. The pedal-controlled movable bottom frame as claimed in claim 2, wherein said two side rods are respectively and pivotally connected with said two movable connecting rods by two U-shaped connectors, which are respectively formed with two parallel side plates respectively having two sliding slots, with two pivots respectively inserted through said sliding slots and the opposite pivotal ends of said two side rods and said two movable connecting rods, said two side rods and said two movable connecting rods able to be pivotally turned by means of said two pivots sliding relatively in said two sliding slots.

6. The pedal-controlled movable bottom frame as claimed in claim 1, wherein said clasping member is formed with an ear having an insert hole for a bolt to be inserted therethrough so as to fix said clasping member at a preset position under said pedal, said ear provided with a position block on the topside near said insert hole, said position block of said clasping member fitted in a position hole bored under said pedal, said ear of said clasping member extending downward slantingly and forming a clasping portion, said clasping portion having its upper side formed with an arc-shaped clasping surface.

7. The pedal-controlled movable bottom frame as claimed in claim 6, wherein said retaining unit comprises a U-shaped frame, a bottom base, a hooking plate and a coupling member, said U-shaped frame formed with two parallel side plates having an accommodating space formed therebetween, said bottom base received in a lower portion of said accommodating space, two bolts inserted through said bottom base and said U-shaped frame to fix them on a fixing plate secured on the inner side of said position rod, said bottom base having its upper side formed with an arc-shaped recess, said bottom base having one side bored with a spring positioning groove communicating with said arc-shaped recess, said hooking plate received in said arc-shaped recess of said bottom base, said hooking plate having one end assembled pivotally between said two side plates of said U-shaped frame by a pivot, said pivot fitted thereon with a torsion spring, said torsion spring having an end inserted in said spring positioning groove of said bottom base, said torsion spring having the other end pushing against the bottom of said hooking plate, said torsion spring always pushing the hook of said clasping plate to turn upward pivotally, said coupling member formed with two parallel side plates, said two side plates having one end assembled pivotally with the upper portion of said two side plates of said U-shaped frame by a pivot, said pivot fitted thereon with a torsion spring, said torsion spring having one end pushing against the inner wall of a back plate connecting said two side plates of said U-shaped frame, said torsion spring having the other end pushing against the inner wall of a top plate connecting said two side plates of said coupling member, a roller pivotally fitted between the other ends of said two side plates of said coupling member, said roller always pushed by said torsion spring to turn upward pivotally, said coupling member having one side plate extending downward and forming an engage edge, said engage edge clasped by said hook of said hooking plate when said coupling member is pivotally turned a first time, said engage edge disengaged from said hook of said hooking plate when said coupling member is pivotally turned a second time, said coupling member pressed downward and turned pivotally by said clasping member under said pedal, said clasping portion of said clasping member having its upper arc-shaped clasping surface clasping the bottom edge of said roller.

8. The pedal-controlled movable bottom frame as claimed in claim 1, wherein said four support legs of said worktable are respectively secured with said U-shaped pivotal lug at a preset location for pivotally connecting said free ends of said rods of said frame body.

* * * * *